(12) United States Patent
Jakubowski

(10) Patent No.: US 6,548,986 B1
(45) Date of Patent: Apr. 15, 2003

(54) BATTERY BACKUP SYSTEM FOR APPLIANCES USING WALL TRANSFORMERS

(75) Inventor: Peter Jakubowski, Huntington Beach, CA (US)

(73) Assignee: Amano Cincinnati, Inc., Roseland, NJ (US)

( * ) Notice: Subject to any disclaimer, the term of this patent is extended or adjusted under 35 U.S.C. 154(b) by 0 days.

(21) Appl. No.: 10/036,682

(22) Filed: Dec. 31, 2001

(51) Int. Cl.[7] .................................................. H02J 7/02
(52) U.S. Cl. ...................................................... 320/111
(58) Field of Search ................................. 320/111, 103, 320/107, 112, 113; 307/64–66, 69, 71, 80, 81, 44, 48, 52, 53, 85; 363/37; 323/207, 208, 272

(56) References Cited

U.S. PATENT DOCUMENTS 4,719,550 A * 1/1988 Powell et al. ................. 363/37
6,121,695 A * 9/2000 Loh ............................. 307/64

* cited by examiner

Primary Examiner—Edward H. Tso
Assistant Examiner—Pia Tibbits
(74) Attorney, Agent, or Firm—Stetina Brunda Garred & Brucker

(57) ABSTRACT

Battery back up system is disclosed for powering a wall transformer when a power supply failure occurs. The system comprises a back up battery connectable to the wall transformer to provide power to the device powered by the wall transformer, upon a power interruption. The system may include an adaptor into which the backup battery and wall transformer may be connected. The adaptor may be connected to a conventional AC power source. Other embodiments of the invention allow a backup battery to be directly connected to the wall transformer.

8 Claims, 9 Drawing Sheets

BATTERY BACKUP SYSTEM FOR APPLIANCES USING WALL TRANSFORMERS

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates to battery backup systems and, more particularly, to battery backups for electrical appliances using wall transformers.

Many companies use keep track of employee time through the use of time clocks that punch time cards. Other time clocks read barcodes or magnetic strips and send the data read to a central computer. With either type of system, employees are unable to clock in or out when a power outage occurs. Although computer servers have battery backups, companies do not typically purchase AC inverters or expensive battery backup options for time clocks or other equipment powered from wall transformers.

A wall transformer is an enclosure that plugs directly into an AC power wall socket, and outputs either a low DC voltage or a low AC voltage, and outputs either a low DC voltage or a low AC voltage. The normal range of the voltages is 5 to 28 volts. The output voltage is communicated to the time clock or other electrical appliance through a wire cable.

Power outages occur for a number of reasons, including a failure at the power company or in the lines between the power company and the consumer. Power outages are a more-than-occasional inconvenience during periods of an energy crisis. A power failure at a business is a particular problem, resulting in substantial loss of operational efficiency, or even complete shutdowns. For many businesses, the expense of large traditional power backup systems is such that they are cost prohibitive. Rather than having to supply a custom backup system for every electrical appliance, a common, interchangeable backup system is preferably for many types of devices.

Uninterruptible power supply ("UPS") systems are used to supply back-up power for computers and other electronic devices. Such systems supply a secondary source of high AC voltage. UPS's have the disadvantage of being prohibitively expensive for many businesses. Other external backup systems use batteries that have DC-AC inverters to supply a secondary source of high AC voltage. Such systems plug directly into an AC outlet and have standard wall-type AC outlets of their own. In order to change which devices are using the backup, a series of disconnections and reconnections is necessary.

Accordingly, there exists a need to devise a common external backup system that mitigates the above mentioned drawbacks. Further, there exists a need to provide a system that could readily adopt to existing devices using a wall transformer, which could be moved from device to device as needed to properly shutdown or complete any necessary data transfer or operation.

BRIEF SUMMARY OF THE INVENTION

A battery backup system is provided for power wall transformer when a power supply failure occurs. The system includes a detachable backup battery that may interface with the device to be powered without disconnecting the device from connection to an AC power supply. As such, the backup battery may be relocated as need to power different devices connected to an AC power supply.

In one embodiment the invention comprises an adaptor disposed intermediate the AC power supply and the device to be powered. The adaptor is plug connectable to an AC source, the device to be powered, and a backup battery. In normal operation the backup battery is charged by the AC source, which also operates the electrical device. During power interruption, the backup battery powers the device and is isolated from the power supply. In this embodiment the backup battery may be supported by the adaptor, and removed from the adaptor to the location of another adaptor, which does not have a backup battery connected thereto. By such means a limited number of backup batteries may be used to provide power to various electrical devices, on a priority basis.

In another embodiment the backup battery is plug connectable to a wall transformer that normally powers an electrical device by direct connection to an AC source. In this embodiment the backup battery is again relocatable to another source without a need to disconnect the wall transformer from its normal connection. Ths avoids interruptions in operation of a first electrical device, while the backup battery is relocated to power another device.

The invention is suitable for use to power AC or DC or DC devices, by means of conventional converter circuitry. Switching circuitry may also be provided to allow the system to adapt to either AC or DC operation.

BRIEF DESCRIPTION OF THE DRAWINGS

FIG. 14 illustrates an alternative adaptor that provides additional support for the backup battery.

DETAILED DESCRIPTION OF THE INVENTION

The present invention attaches to the appliance's own wall transformer. In this way, the only modification necessary, if any, is to the separately manufactured wall transformer and not the appliance itself. The output of the battery backup is communicated to the appliance through the same wire cable as the wall transformer. During a power outage, it may be of critical importance to provide power to some appliances, while the non-operational status of others is merely inconvenient. The design of the present invention allows the backup battery to be conveniently moved from appliance to appliance and attached directly to the wall transformer of each. Thus, the backup can be used where needed when needed, eliminating the need for multiple backups and reducing cost accordingly.

The connection from the output of the battery backup to the output of the wall transformer may use any of various electrical connection methods. The wall transformers can provide an output of either AC or DC voltage.

If the output of the wall transformer is DC, then the output of the battery backup can generally be connected in parallel to the wall transformer output. When the AC power is not available the wall transformer would provide DC voltage to the appliances and rectifiers would prevent the AC transformer from loading the battery backup. Depending on the electrical appliance design, it may be possible to use the backup battery output even though the effective battery backup voltage may be less than the wall transformer output voltage. However, if an AC voltage is required by the electrical appliance, then an AC inverter must be included in the battery backup.

In such case the battery backup charging circuit can include a converter circuit to convert the AC output voltage to a DC voltage (or rectified AC voltage to charge the battery backup).

One embodiment of the invention comprises an adaptor connectable to the AC supply, the wall transformer and a battery backup pack. The back side of the adaptor comprises a male plug engageable to a power source. The front side of the adaptor comprises female plugs into which the battery backup and wall transformer can be plugged. The circuitry of the adaptor allows power to flow from the battery to the wall transformer in the event of a power outage. This configuration has the advantage that no modification to the wall transformer is necessary and the battery pack is easily transported to another adaptor, connected to a different appliance.

Figure 1:
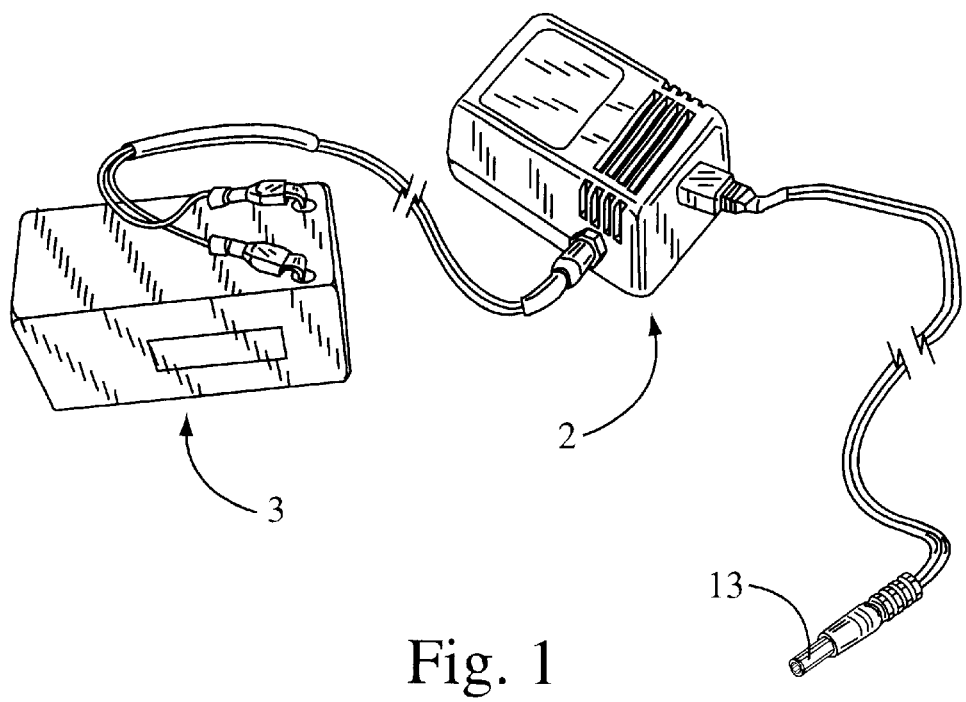
FIG. 1 is an illustration of a battery backup designed in accordance with the present invention attached to a typical wall transformer.
Figure 2:
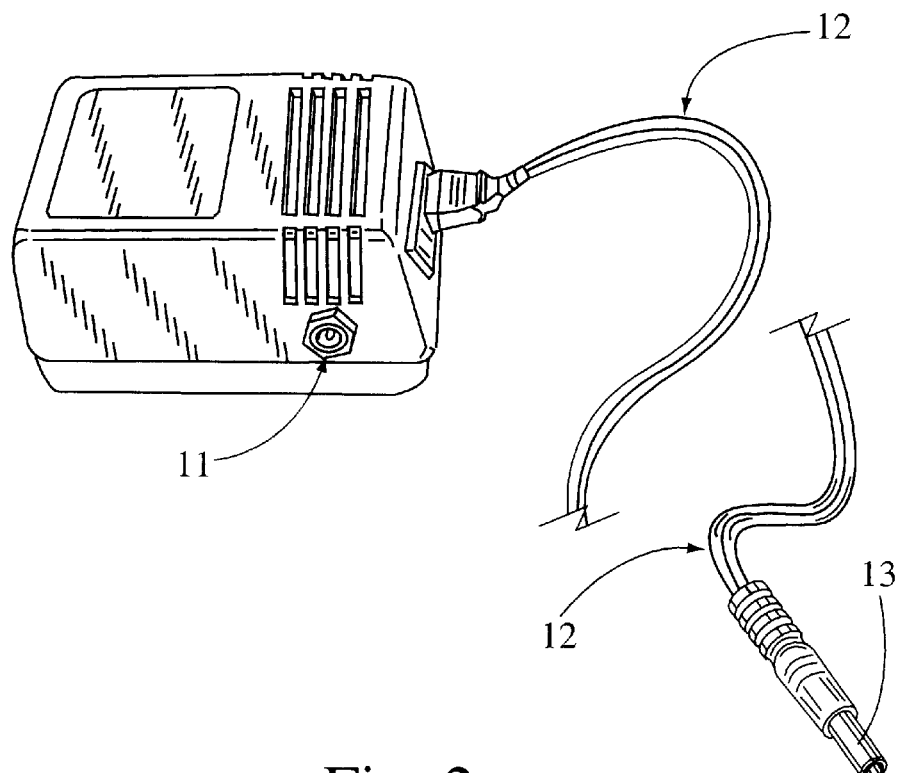
FIG. 2 is an illustration of a wall transformer, indicating connectors.

A basic configuration of the invention is illustrated in FIG. 1. It consists of a wall transformer 2 and a battery of backup source 3. The wall transformer connections are shown in FIG. 2. Connector 11 connects the backup source 3 to the transformer 2. The connector may utilize as few as 2 connections, and may use other connections for increased capabilities, including recharging, DC-DC conversion and DC-AC conversion from the backup source.

Figure 3:
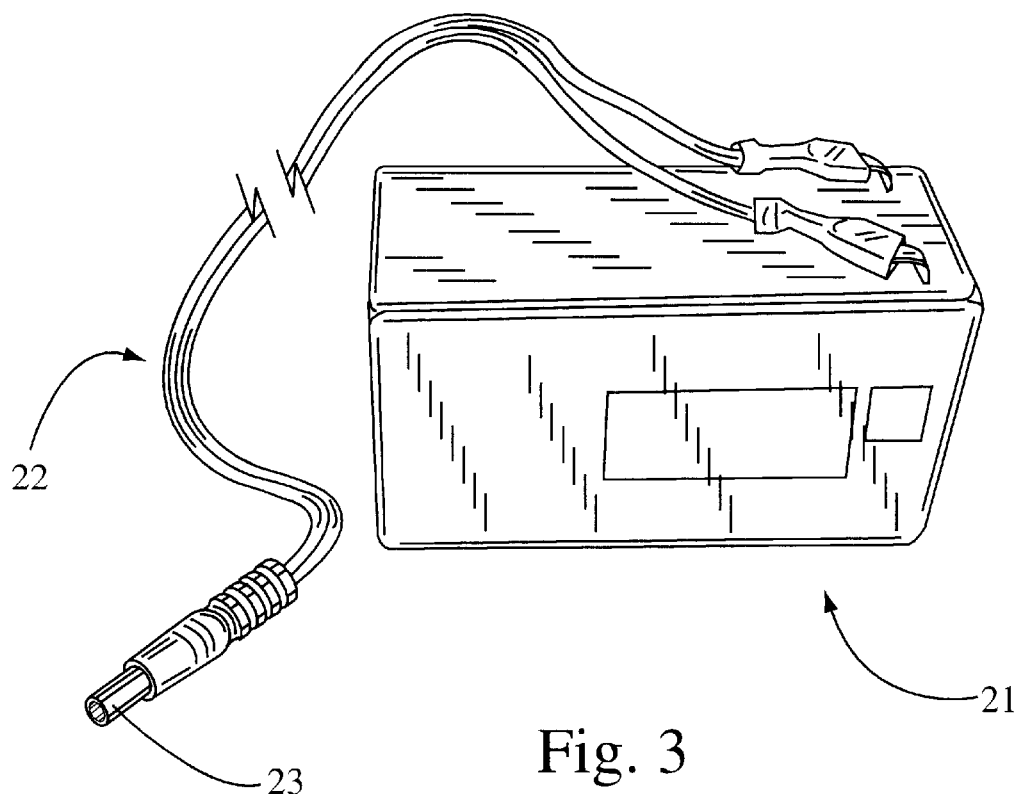
FIG. 3 is an illustration of the battery backup, indicating connectors.

FIG. 3 illustrates the backup power source connections. As shown therein battery 21 is the backup power source. Its output cable includes a connecter 23 that is connectable to the connector 11 in the wall transformer.

Figure 4:
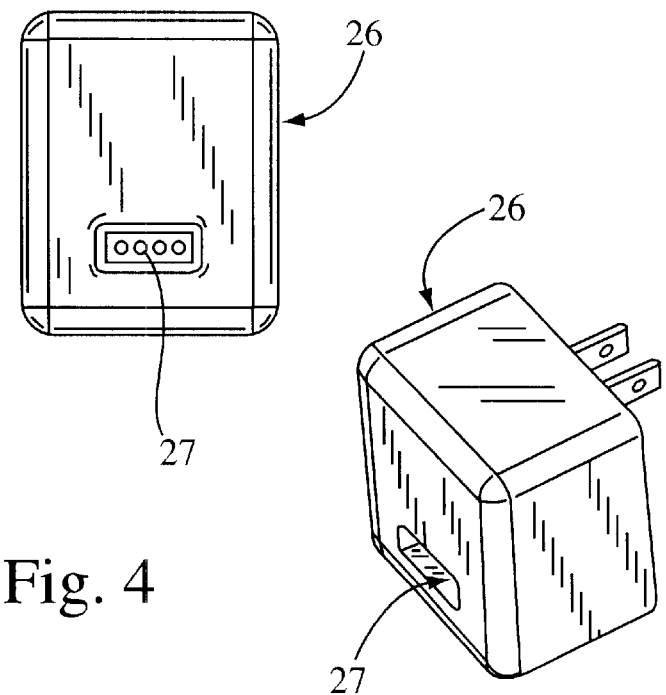
FIG. 4 is an illustration of a wall transformer with a different connector type.
Figure 5A:
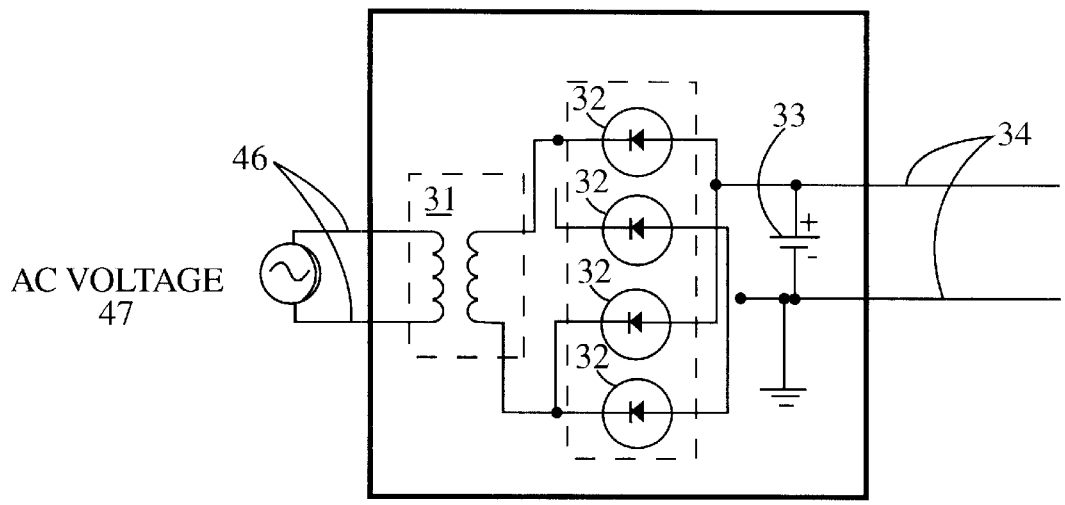
FIG. 5A is an electrical diagram of a basic DC wall transformer.

FIG. 4 illustrates another type of connector 27 disposed in a different location on the wall transformer 26. FIG. 5A is a sample schematic of a basic DC wall transformer 30. The transformer 31, rectifier 32 and capacitor 33 are electrically connected so that the AC power 47 is connected to the enclosure 30 through conductors 46 and is then rectified to a DC waveform. DC ripple is reduced by the smoothing capacitor 33. The output DC voltage is then communicated to the electrical appliance through conductors 34.

Figure 5B:
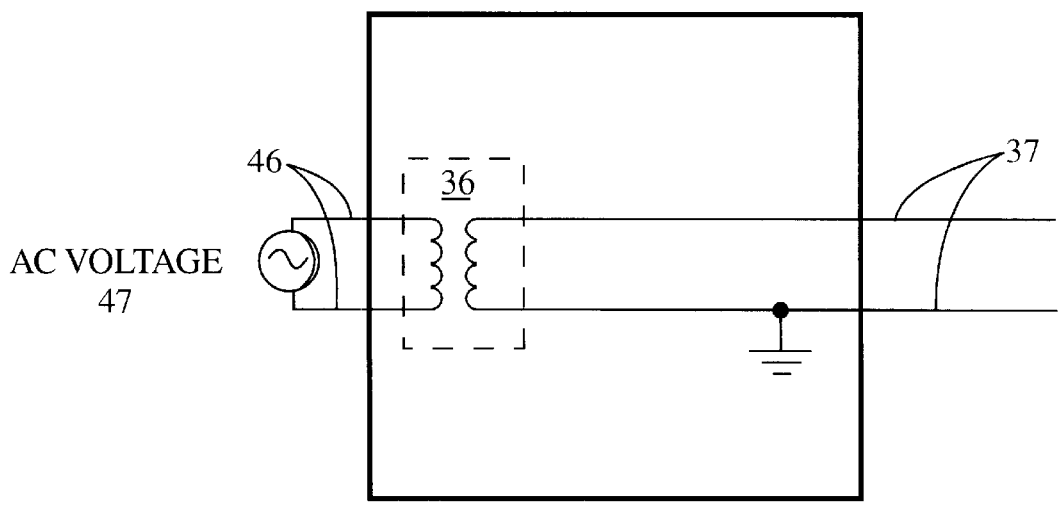
FIG. 5B is an electrical diagram of a basic AC wall transformer.

FIG. 5B is a sample schematic of a wall transformer 35 that ouputs a low AC voltage. The output AC voltage is then connected to the electrical appliance through conductors 34.

Figure 6:
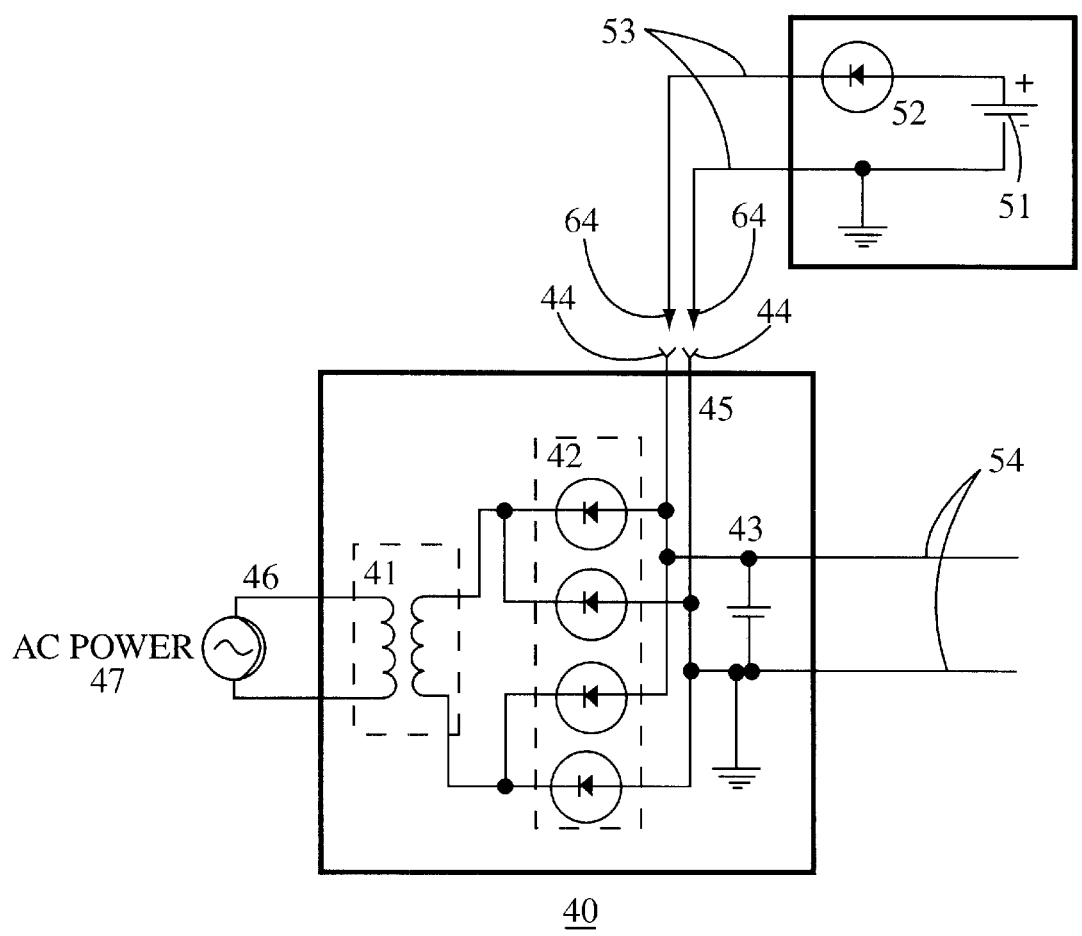
FIG. 6 is an electrical diagram of a DC wall transformer connected to a DC battery backup.

FIG. 6 is a schematic diagram of a DC wall transformer with an external DC battery backup output. As shown therein, the AC power supply 47 communicates power to the wall transformer enclosure 40 via conductors 46. The AC input power is directed to transformer 41, the secondary of which is connected to diode circuit 42. The output of the diode circuit 42 is smoothed by capacitor 43 and output along conductors 54.

Battery backup pack 50 comprises backup battery 51 and diode 52. The battery backup pack 50 is connected to the wall transformer enclosure 40 via conductors 53, and connectors 44, 54. In practice, the battery backup pack 50 is connected in parallel to the wall transformer enclosure 40 to provide a backup DC voltage when the output from the diode circuit 42 falls below a prescribed voltage level, e.g. the level of battery 51.

Figure 7:
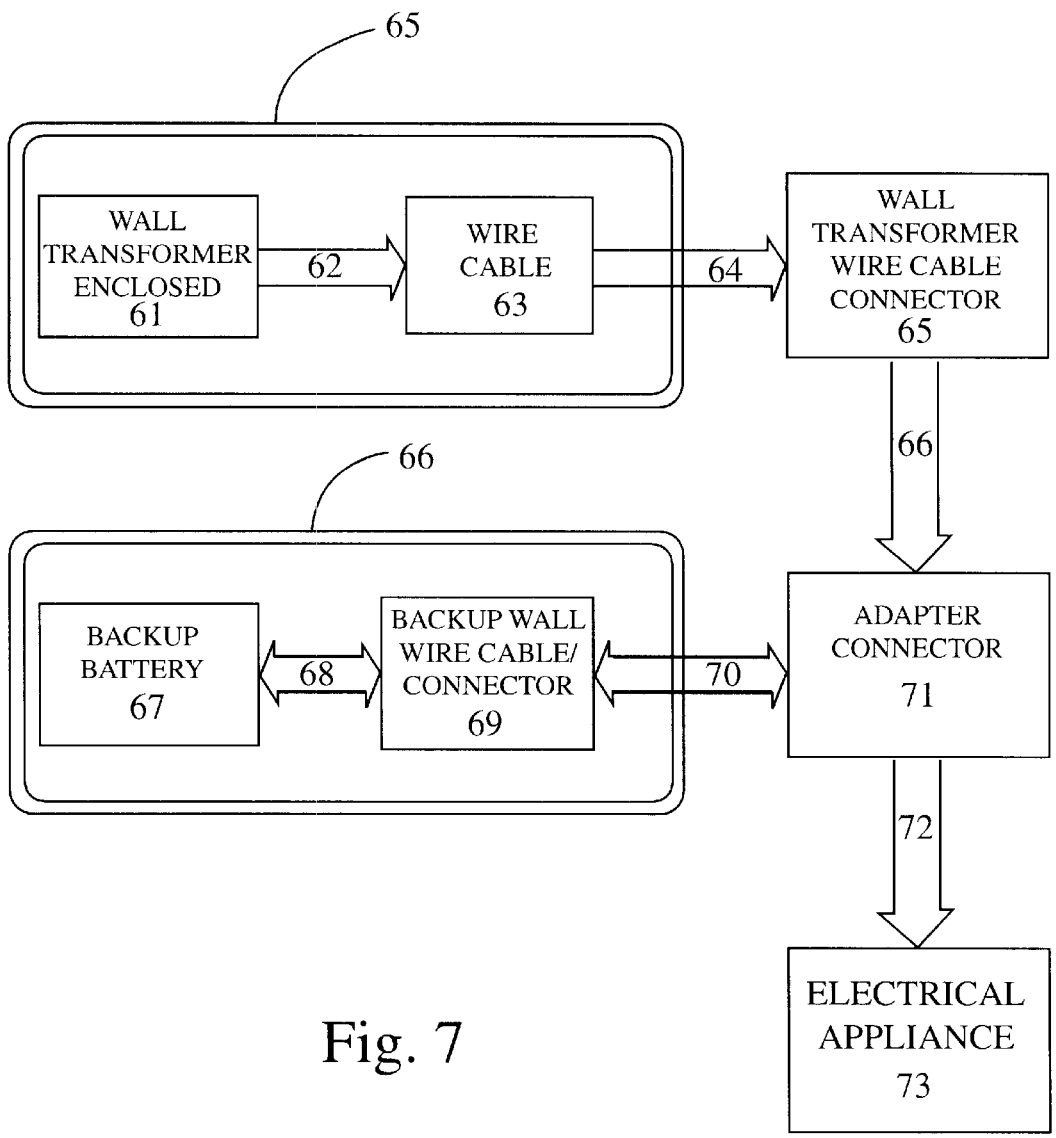
FIG. 7 is an electrical diagram of an AC wall transformer connected to an AC battery backup.
Figure 8:
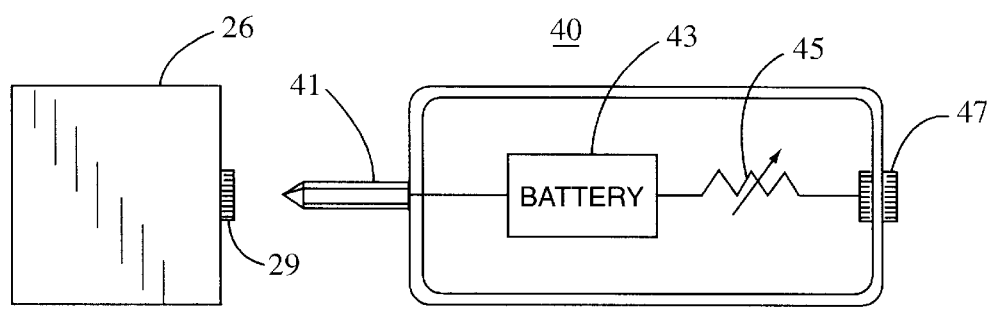
FIG. 8 is an electrical diagram illustrating an embodiment of the invention outputting a DC voltage.

FIG. 7 illustrates an embodiment wherein the battery backup pack is connected to the output of the wall transformer, rather than to a wall transformer input port. As shown therein, the wall transformer 65 and the battery backup 66 are connected to adaptor connector 71, which may be formed a Y connector allowing parallel inputs from the wall transformer 65 and the backup battery pack 66. The output of adaptor connector 71 is connected to the electrical appliance 73.

Another feature of the invention is illustrated in connection with FIGS. 8–11. As shown therein, the battery backup pack may be plug-connectable to the wall transformer 26 by means of a plug, such as a male phono plug. In such a case the plug may provide mechanical support, as well as an electrical communication path, to support the battery backup 40 on the wall transformer 26. The battery backup port 40 includes a male plug 41 engageable to an input port of the wall transformer 26. The plug 41 is in electrical communication with the backup battery 43 to charge the backup battery. The output of the battery 43 is communicated through a variable resistor 45 to an output port 47 which may be in electrical communication with the electrical appliance being operated. In such a case, the electrical appliance may be disconnected from the wall transformer output port 29 to allow the battery backup pack to be connected in its place. The appliance may then be connected to the output port 47 of the battery backup 40.

Figure 9:
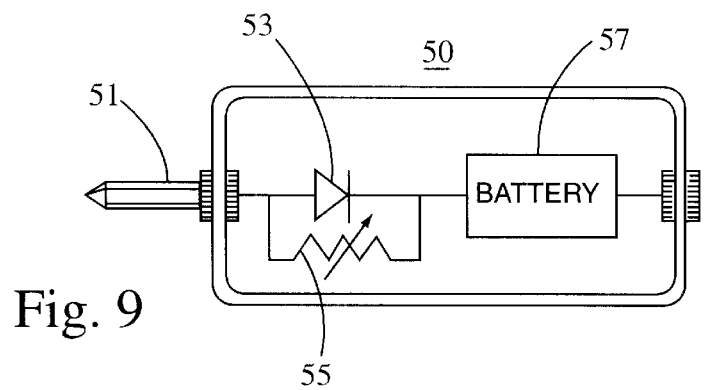
FIG. 9 illustrates an alternate embodiment of the invention outputting a DC voltage.

FIG. 9 illustrates another embodiment of the invention wherein the battery backup 50 may be connected to and supported by connection to the wall transformer 26. However, in the embodiment disclosed at FIG. 9 a single input/output port is used. The input circuit communicates power from the wall transformer 26 to the backup battery 57 via a path through diode 53. The output of the battery backup pack 50 is communicated from the battery 57 to input/output port 51 via variable resistor 55. The variable resistor may be included as a voltage regulator.

Figure 10:
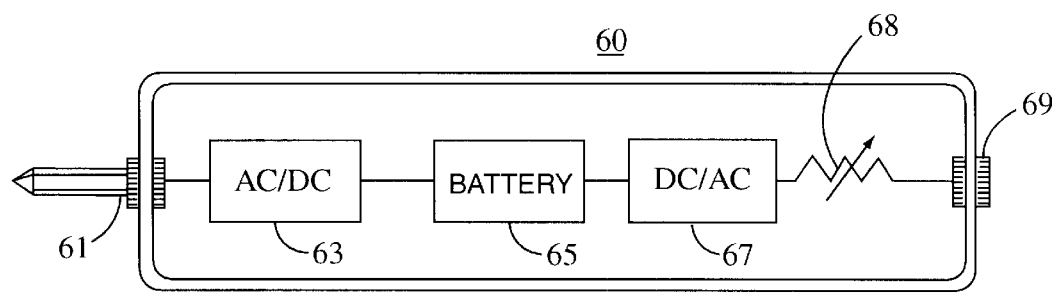
FIG. 10 illustrates an alternate embodiment of the invention operative to output an AC voltage.

Referring to FIG. 10, another embodiment is shown wherein the battery backup pack 60 is operative to generate an AC output voltage. As shown therein the input power to battery backup pack 60 is an AC signal communicated from the input port 61 to AC/DC converter 63. The output of converter 63 is a DC signal which is used to store charge on battery 65. The battery backup pack 60 is operative to output power from battery 65 to DC/AC converter 67. The AC output signal from converter 67 is communicated to output port 69. Variable resistor 68 may be disposed intermediate converter 67 and output port 69 for the purpose of voltage regulation.

Figure 11:
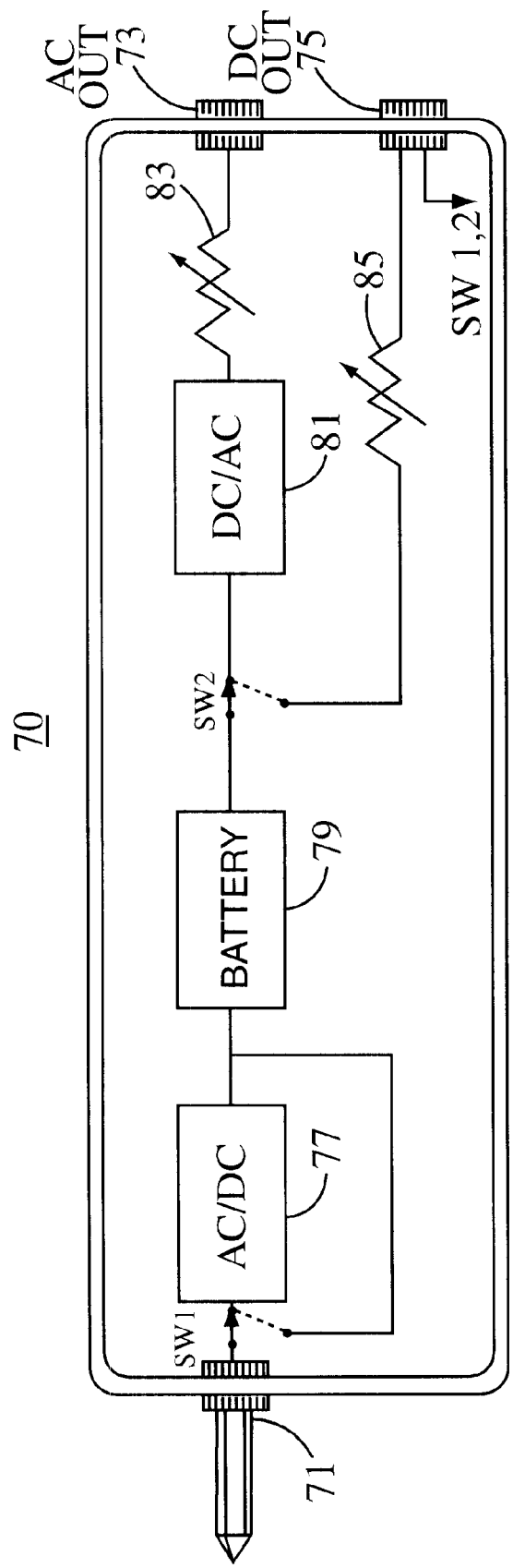
FIG. 11 illustrates an alternate embodiment of the invention operative to output either an AC or a DC voltage.

FIG. 11 illustrates another embodiment of the invention, which is operative to accommodate either AC or DC operating voltages. The signal to battery backup port 70 is communicated to input port 71. The output of battery backup port 70 is communicated to AC output port 73 or DC output port 75. When an AC signal is applied, the signal is communicated from input port 71 to AC/DC converter 77. The DC signal is used to charge battery 79. The output of battery 79 is applied to DC/AC converter 81 which generates an AC output signal that is communicated to AC output port 73. When a DC operating signal is utilized, switch 1 and switch 2 are switched to alternate positions such that converters 77 and 81 are bypassed and the battery output is communicated to DC output port 75. In one embodiment the battery backup 70 may be operative to sense the presence of a connections to DC output port 75, to automatically switch SW1 and SW2 to the DC operating position, to bypass converter 77 and 81. Variable resistors 83 and 85 may also be utilized to regulate the AC and DC output voltages.

Figure 12:
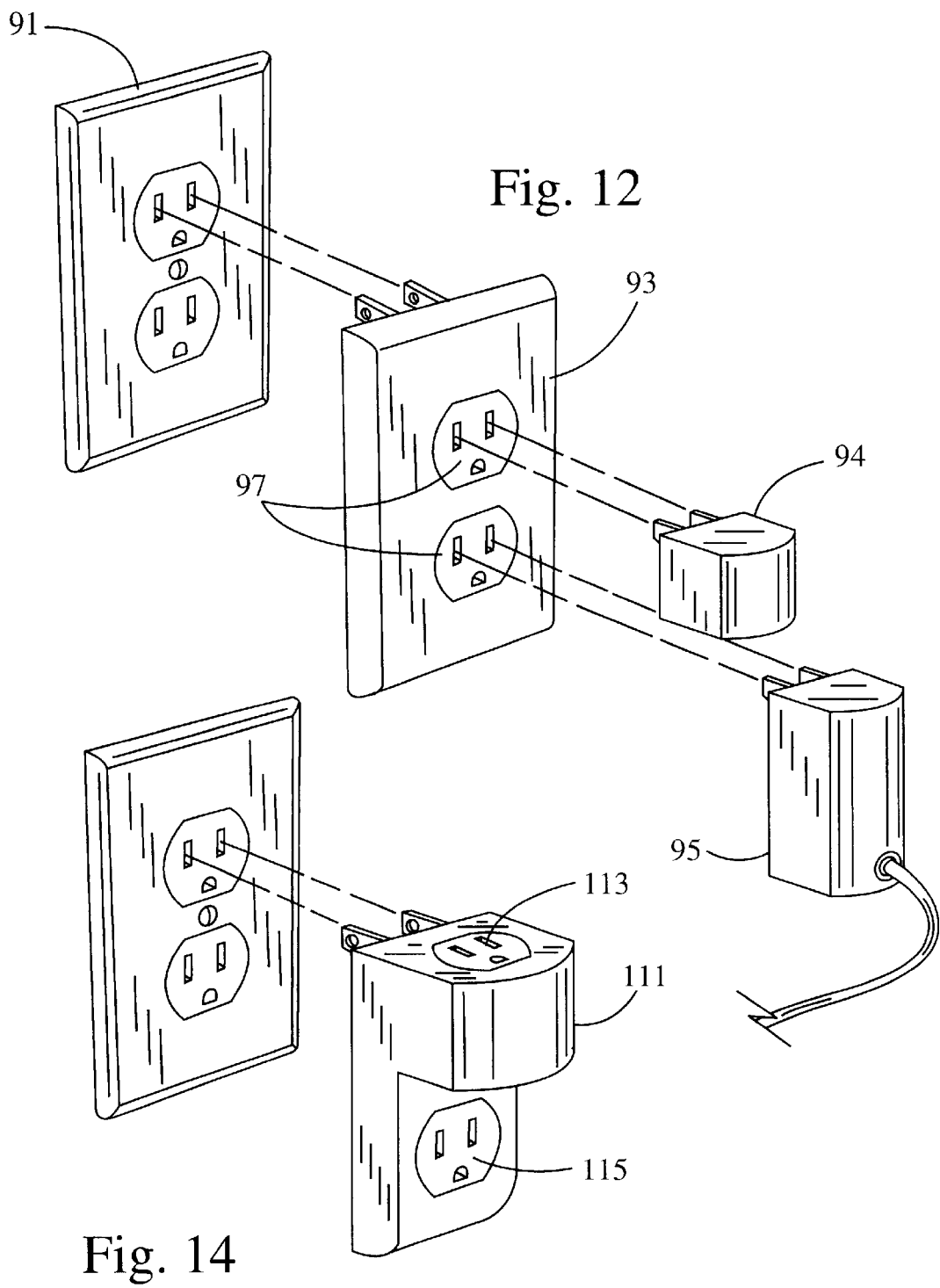
FIG. 12 illustrates an embodiment of the invention using an adaptor to connect the wall to a transformer and backup battery to an AC source.

A further embodiment of the invention is depicted in FIG. 12. As shown therein, the control circuitry of the battery backup pack may be incorporated into an adaptor 93. The adaptor's back side comprises male plugs engageable to a power source 91, such as a standard home wall power source. The panel also comprises female plugs 97 into which battery backup pack 94 can be plugged. The wall transformer 95 of an appliance to be powered can be plugged into the other female plug 97B. In this configuration the backup features of the present invention are provided without the need for modification of wall transformers to be used in conjunction therewith.

Figure 13:
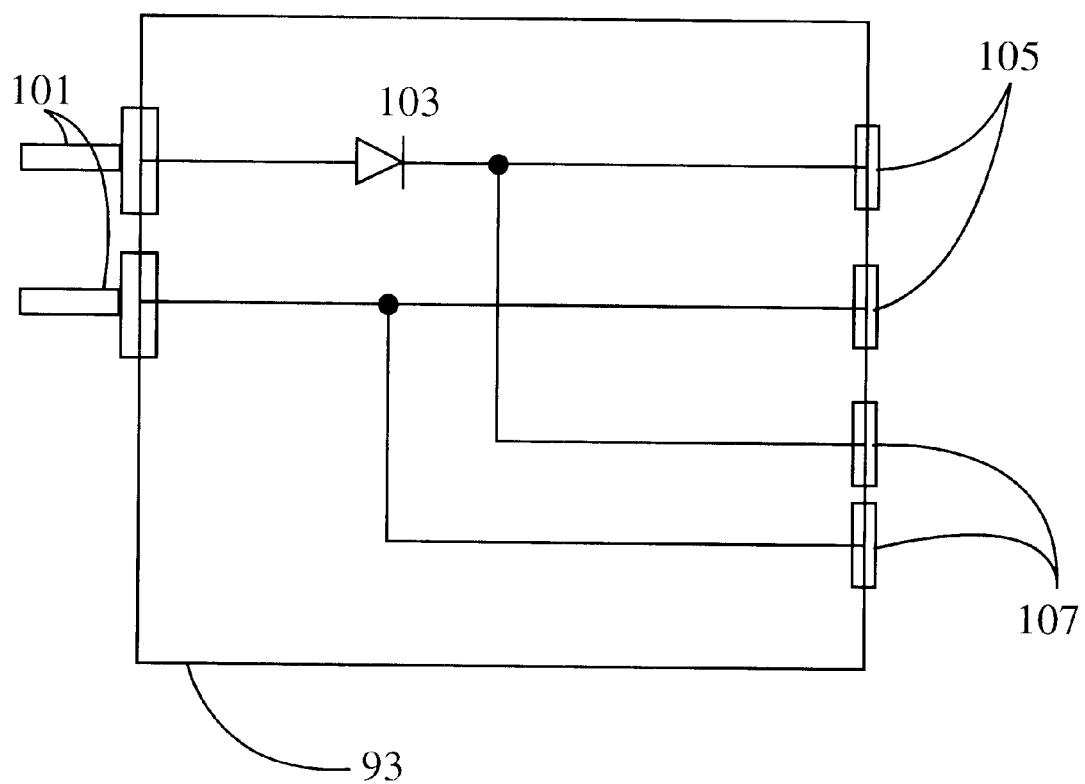
FIG. 13 is an electrical diagram of exemplary circuitry within the adaptor depicted by FIG. 12.

The function of adaptor 93 is illustrated by FIG. 13. Power flows from a power source to which the adaptor is connected through male plug 101, then through a diode 103 to female plugs 105 and 107. The battery backup pack may be attached to either female plug 105 or 107, and the wall transformer may be attached to the other female plug. The diode 103 is biased such that power will flow in the direction of female plugs 105 and 107. Thus, in the event that a power outage causes a cessation of power flow from the power source, power will flow from the battery to a device attached to the other plug.

The adaptor may take a variety of embodiments designed to provide increased convenience or additional features. One such embodiment is illustrated by FIG. 14. As shown therein, the adaptor may comprise an extruded body 111. One female plug 113 (to engage the backup battery) may be located on the upper surface of the body 111, and the other (to engage the wall transformer) may be located on the side of the body 111. If the battery backup pack is plugged into the female plug 113 on top of the body 111, the body 111 will provide physical support for the battery backup, as well as make it more convenient to distinguish and remove or install the battery backup.

As will be recognized by those of ordinary skill in the art various other implementations and modifications may be made to the invention, without departing from the broader spirit and scope of the invention as described herein.

What is claimed is:

1. A battery backup system for powering a wall transformer when a power supply failure occurs comprising:

a) a backup battery; and b) an adaptor sized and configured to be mechanically mountable to the power supply and physically supportable thereby, the adaptor having an input port plug connectable to the power supply, an output port plug connectable to the wall transformer, and an input/output port plug connectable to the backup battery, the adaptor having circuitry connecting the output and input/output ports, and isolation circuitry for isolating the power supply from the output and input/output ports when a power supply failure occurs.

2. The system as recited in claim 1 wherein the backup battery is engageable/disengageable from the adaptor without disengaging the adaptor from either the power supply or the wall transformer.

3. The system as recited in claim 1 wherein the wall transformer is engageable/disengageable from the adaptor without disengaging the adaptor from either the backup battery or the power supply.

4. The system as recited in claim 1 wherein the backup battery is physically supported by engagement to the adaptor.

5. A battery backup device for powering wall-mounted transformer connectable to a power source and an electrical appliance, the battery backup device comprising:

a) an input/output port connectable to the wall transformer;

b) a backup battery in electrical communication with the input/output port, operative to supply power to the transformer when power to the transformer is interrupted; and c) a plug extendable from the input/output port, operative to connect the input/output port to the wall transformer and to physically support the battery backup pack by mechanical connection to the wall transformer.

6. A battery backup device as recited in claim 5, wherein the battery backup plug is engageable/disengageable to the wall transformer without disconnecting the wall transformer from the electrical appliance.

7. A battery backup device as recited in claim 5, wherein the battery backup is engageable/disengageable to the wall transformer without disconnecting the wall transformer from the power source.

8. A battery backup device as recited in claim 5, further comprising:

a) an AC/DC converter disposed intermediate the input/output port and the backup battery;

b) a DC/AC converter disposed intermediate a backup battery and the input/output port; and c) a switching circuit for bypassing the AC/DC converter and the DC/AC converter when the electrical appliance is a DC appliance.

* * * * *